United States Patent
Ravichandran et al.

(10) Patent No.: US 11,268,582 B2
(45) Date of Patent: Mar. 8, 2022

(54) SYSTEMS AND METHODS FOR TORQUE SHAPING

(71) Applicant: FORD GLOBAL TECHNOLOGIES, LLC, Dearborn, MI (US)

(72) Inventors: Maruthi Thiruninravur Ravichandran, Hamilton (CA); Jason Meyer, Canton, MI (US); Rajit Johri, Canton, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 235 days.

(21) Appl. No.: 16/741,021

(22) Filed: Jan. 13, 2020

(65) Prior Publication Data

US 2021/0215211 A1    Jul. 15, 2021

(51) Int. Cl.
| | |
|---|---|
| *B60W 50/10* | (2012.01) |
| *F16D 48/10* | (2006.01) |
| *F16H 57/12* | (2006.01) |
| *F16H 63/50* | (2006.01) |

(52) U.S. Cl.
CPC .............. *F16D 48/10* (2013.01); *B60W 50/10* (2013.01); *F16H 57/12* (2013.01); *B60W 2520/30* (2013.01); *B60W 2720/30* (2013.01); *F16H 2063/508* (2013.01)

(58) Field of Classification Search
CPC .... F16D 48/10; F16H 57/12; F16H 2063/508; B60W 10/06; B60W 10/08; B60W 50/10; B60W 20/10; B60W 20/17; B60W 30/025; B60W 30/188; B60W 30/20; B60W 2520/30; B60W 2540/10; B60W 2710/0666; B60W 2710/083; B60W 2720/30
See application file for complete search history.

(56) References Cited

U.S. PATENT DOCUMENTS

| | | |
|---|---|---|
| 9,091,219 B2 | 7/2015 | Kar et al. |
| 9,365,204 B2 | 6/2016 | Whitney et al. |
| 10,449,948 B2 | 10/2019 | Kim et al. |
| 2016/0244043 A1* | 8/2016 | Nefcy .................... B60W 20/30 |
| 2017/0129474 A1* | 5/2017 | Sato ...................... B60W 20/15 |
| 2018/0009434 A1* | 1/2018 | Hayakawa ............. B60K 6/445 |
| 2018/0050609 A1* | 2/2018 | Meyer ................... B60W 10/08 |
| 2020/0269702 A1 | 8/2020 | Meyer et al. |
| 2021/0023944 A1 | 1/2021 | Ravichandran et al. |

* cited by examiner

*Primary Examiner* — Edwin A Young
(74) *Attorney, Agent, or Firm* — David B Kelley; Brooks Kushman P.C.

(57) ABSTRACT

A vehicle includes controller programmed to receive a driver-demanded wheel torque command and calculate a shaped wheel torque command based on the driver-demanded wheel torque command. The controller is further programmed to, in response to the driver-demanded wheel torque command changing from a first magnitude that is greater than an estimated wheel torque at a last time step to a second magnitude that is less than the estimated wheel torque at a current time step, set the shaped wheel torque to a minimum of a magnitude of the shaped wheel torque at the last time step and an estimated wheel torque at the current time step. The controller is also programmed to command the first and second actuators to produce the shaped wheel torque.

20 Claims, 3 Drawing Sheets

SYSTEMS AND METHODS FOR TORQUE SHAPING

TECHNICAL FIELD

The present disclosure relates to controlling electrified vehicle powertrains and more specifically to shaping driver-demanded torque.

BACKGROUND

Audible and tactile events may occur within a vehicle driveline during transient torque events and may be caused by lash in the mechanical couplings (such as gears, splines, or U-joints) of the driveline. Longitudinal acceleration of the vehicle may also occur during transient torque events due to shuffle. Vehicle torque commands may be shaped to mitigate driveline disturbances.

SUMMARY

According to one embodiment, a vehicle includes an axle having wheels and a powertrain including a transmission, a first actuator upstream of the transmission, and a second actuator downstream of the transmission. The first and second actuators are configured to power the wheels. A vehicle controller is programmed to receive a driver-demanded wheel torque command and calculate a shaped wheel torque command based on the driver-demanded wheel torque command. The controller is further programmed to, in response to the driver-demanded wheel torque command changing from a first magnitude that is greater than an estimated wheel torque at a last time step to a second magnitude that is less than the estimated wheel torque at a current time step, set the shaped wheel torque to a minimum of (i) a magnitude of the shaped wheel torque at the last time step and (ii) an estimated wheel torque at the current time step. The controller is also programmed to command the first and second actuators to produce the shaped wheel torque.

According to another embodiment, a method of shaping wheel torque in a vehicle having a transmission, a first actuator upstream of the transmission, and a second actuator downstream of the transmission is disclosed. The method includes receiving a series of driver-demanded wheel torque commands; calculating a series of shaped wheel torque commands based on the driver-demanded wheel torque commands; in response to the driver-demanded wheel torque commands changing from a first magnitude that is greater than estimated wheel torque at a last time step to a second magnitude that is less than the estimated wheel torque at a current time step, reducing the shaped wheel torque to a minimum of (i) a magnitude of the shaped wheel torque at the last time step and (ii) an estimated wheel torque at the current time step; and commanding the first and second actuators to produce the reduced shaped wheel torque.

According to yet another embodiment, a vehicle includes a first axle having first wheels, a second axle having second wheels, a first actuator configured to power the first axle, and a powertrain configured to power the second axle. The powertrain has a transmission and a second actuator upstream of the transmission A controller is programmed to receive a driver-demanded wheel torque command for the first and second wheels and calculate a shaped wheel torque command based on the driver-demanded wheel torque command. The controller is further programmed to, in response to the driver-demanded wheel torque command changing from a first magnitude that is greater than estimated wheel torque of the first and second wheels at a last time step to a second magnitude that is less than the estimated wheel torque at a current time step, set the shaped wheel torque to a minimum of (i) a magnitude of the shaped wheel torque at the last time step and (ii) an estimated wheel torque at the current time step, and command the first and second actuators to produce the set shaped wheel torque.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
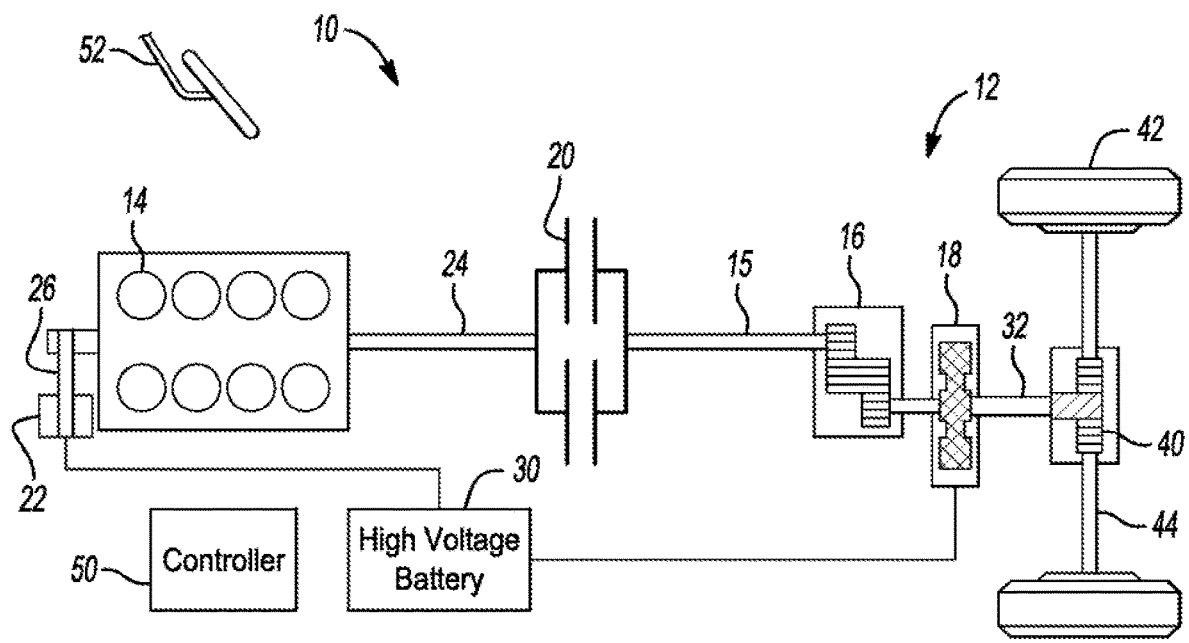
FIG. 1 is a schematic diagram of a hybrid-electric vehicle according to one embodiment.

Referring to FIG. 1, a schematic diagram of a hybrid-electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12 having at least one upstream actuator, e.g., engine 14, that drives an input shaft 15 of a transmission 16. The powertrain 12 also includes a downstream actuator, e.g., electric machine 18, connected to an output shaft of the transmission 16. The transmission 16 may be a multiple step-ratio transmission that includes multiple speed ratios (also called gear ratios or gears). The transmission 16 may be a traditional planetary automatic or an automated-manual transmission. The engine 14 is selectively coupled to the transmission 16 by a launch device 20. The launch device 20 is configured to connect and disconnect the engine 14 as well as launch the vehicle. For example, the launch device 20 includes a fully engaged position in which the engine 14 is coupled to the driveline, a fully disengaged position in which the engine 14 is decoupled from the driveline, and a slipping state used to launch the vehicle 10. The launch device 20 may be packaged as part of the transmission 16. Example launch devices include dry clutches, wet clutches, and the like. In some embodiments, the dual-purpose launch device 20 may be replaced with a disconnect clutch the serves to couple the engine and a fluid coupling (e.g., a torque converter) that serves as a launch device. A second upstream actuator 22 may be provided in some embodiments. The actuator 22 may be an electric machine connected to the crankshaft 24 of the engine via a belt drive 26, such as the accessory belt. This is commonly called a belt-driven starter generator. The engine 14, the launch device 20, the electric machine 18, and the transmission 16 may be connected sequentially in series, as illustrated in FIG. 1 but other arrangements are contemplated.

The engine 14 generally represents an actuator that may include an internal-combustion engine such as a gasoline, diesel, or natural gas powered engine. The engine 14 generates an engine power and corresponding engine torque that is supplied to the transmission 16 when the engine 14 is coupled. The electric machine 18 may be implemented by any one of a plurality of types of electric machines. For example, electric machine 18 may be a permanent magnet synchronous motor. Power electronics condition direct current (DC) power provided by a traction battery 30 to the requirements of the electric machine 18, as will be described below. For example, power electronics may provide three-phase alternating current (AC) to the electric machine 18 and/or the electric machine 22.

The electric machine 18 may operate as a generator to convert rotational energy provided by the crankshaft 24 into electrical energy to be stored in the battery 30. The launch device 20 can also be disengaged to isolate the engine 14 from the remainder of the powertrain 12 such that the electric machine 18 can act as the sole drive source for the HEV 10.

As shown in the representative embodiment of FIG. 1, the output shaft 32 is connected to a differential 40. The differential 40 drives a pair of wheels 42 via respective axles 44 connected to the differential 40. The differential 40 transmits torque to each wheel 42 while permitting speed differences to facilitate cornering. Different types of differentials or similar devices may be used to distribute torque from the powertrain to the wheels. In some applications, torque distribution may vary depending on the particular operating mode or condition, for example.

The powertrain 12 further includes one or more controllers 50 such as a powertrain control unit (PCU), an engine control module (ECM), and a motor control unit (MCU). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals and/or data from various sensors to control functions such as starting/stopping, operating electric machine 18 to provide wheel torque or charge the battery 30, operate the engine 14, select or schedule transmission shifts, etc. The controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals/data to and/or from the engine 14, the launch device 20, the electric machine 18, the electric machine 22, the transmission 16, and the power electronics. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel-injection timing, rate, and duration, throttle-valve position, spark plug ignition timing (for spark-ignition engines), intake/exhaust valve timing and duration, front-end accessory drive (FEAD) components such as an alternator, air conditioning compressor, battery charging, regenerative braking, electric machine operation, clutch pressures for launch device 20, and transmission 16, and the like. Sensors communicating input through the I/O interface may be used to indicate turbocharger boost pressure (if applicable), crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust gas oxygen (EGO) or other exhaust gas component concentration or presence, intake-air flow (MAF), transmission gear, ratio, or mode, transmission-oil temperature (TOT), and deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle 10 to demand torque and power to propel the vehicle. In general, depressing and releasing the pedal 52 generates accelerator pedal position data that may be interpreted by the controller 50 as a demand for increased power or decreased power, respectively. The torque requested by the driver or in some cases by the vehicle itself may be referred to as driver-demanded torque. The controller 50 includes programming and lookup tables for calculating the driver-demanded torque based on the accelerator pedal position data and other factors, such as vehicle speed. The driver-demanded torque may refer to the desired torque at the wheels. If the vehicle is two-wheel drive, this is the sum of the wheel torque of the two driven wheels. If the vehicle is four-wheel drive, this is the sum of wheel torque of all four of the wheels.

To drive the vehicle with at least the engine 14, the launch device 20 is at least partially engaged to transfer at least a portion of the engine torque through the launch device 20 to the transmission 16, and then from the electric machine 18 to the wheels 42. When the engine 14 alone provides the torque necessary to propel the vehicle, this operation mode may be referred to as the "engine mode," "engine-only mode," or "mechanical mode." The electric machine 18 may assist the engine 14 by providing additional power to turn the wheels 42. This operation mode may be referred to as a "hybrid mode," an "engine-motor mode," or an "electric-assist mode." To drive the vehicle with the electric machine 18 as the sole power source, the power flow remains the same except the launch device 20 isolates the engine 14 from the remainder of the powertrain 12. Combustion in the engine 14 may be disabled or otherwise OFF during this time to conserve fuel. The traction battery 30 transmits stored electrical energy through wiring to the power electronics that may include an inverter, for example. The power electronics convert DC voltage from the battery 30 into AC voltage to be used by the electric machine 18. The controller 50 commands the power electronics to convert voltage from the battery 30 to an AC voltage provided to the electric machine 18 to provide positive torque (drive torque) or negative torque (regenerative braking) to the shaft 32. This operation mode may be referred to as an "electric only mode," "EV (electric vehicle) mode," or "motor mode."

In any mode of operation, the electric machine 18 may act as a motor and provide a driving force for the powertrain 12. Alternatively, the electric machine 18 may act as a generator and convert kinetic energy from the powertrain 12 into electric energy to be stored in the battery 30. The electric machine 18 may act as a generator while the engine 14 is providing propulsion power for the vehicle 10, for example. The electric machine 18 may additionally act as a generator during times of regenerative braking in which rotational energy from spinning wheels 42 is transferred back through the transmission 16 and is converted into electrical energy for storage in the battery 30. The electric machine 18 may be referred to as providing negative torque when acting as a generator. For simplicity, the electric machine 18 may be referred to as a motor.

It should be understood that the schematic illustrated in FIG. 1 is merely exemplary and is not intended to be limiting. Other configurations are contemplated that utilize selective engagement of both an engine and a motor to transmit power to the wheels. For example, the electric machine 18 may be offset from the shaft 32. Other configurations are contemplated without deviating from the scope of the present disclosure.

The controller 50 is programmed to shape, i.e., modify, the driver-demanded torque to improve drivability and smoothness. Torque shaping may be performed to manage clunk and shuffle of the powertrain 12. The shaped torque may be referred to as a shaped wheel torque command, which is based on the driver-demanded torque command. The shaping is based on powertrain speed estimates/measurements, wheel speed estimates/measurements, vehicle speed estimates/measurements, powertrain torque estimates/measurements, accelerator pedal position, brake pedal position, driver selected mode (e.g., sport mode, eco mode, etc.), inferred or adapted drive mode (e.g., automatic mode change based on driver behavior), driver selected gear, and automatic transmission selected gear. The torque shaping may be different for different operating modes of the driveline, i.e., positive contact, negative contact, and lash modes, and for the transitions between these modes. The vehicle may include a set of logics that determines which mode the driveline is operating in. This determination may be based on estimated/measured driveline speed, estimated/measured wheel speed, estimated/measured vehicle speed, driver-demanded torque, estimated/measured drive shaft torque, estimated/measured axle torque, estimated/measured wheel torque, and estimated/measured intermediate shaft torque.

This application focuses on the initialization of the shaped-torque commands so that the resulting response of the vehicle is aligned with driver expectations. Applicant's co-pending applications U.S. patent application Ser. No. 16/284,251 (filed Feb. 25, 2019) and U.S. patent application Ser. No. 16/521,885 (filed Jul. 25, 2019), which are incorporated in their entirety by reference herein, describe example controls/methods for torque shaping after initialization.

Initialization occurs when a direction of the torque, e.g., increasing torque to decreasing torque or decreasing torque to increasing torque, changes by a threshold amount. For example, initialization may occur due to a change in the accelerator pedal position, a change in the automatic cruise control system, a change in an automated driving system, a transmission shift, a traction control event, motor slip regulation, a braking event, engine start or stop, anti-shuffle control, motor power control, active motor damping, and the like. Initialization refers to the first commanded torque at the start of torque shaping. That is, the initialization is the shaped torque commanded during the first control loop (cycle) of the controller 50.

Figure 2:
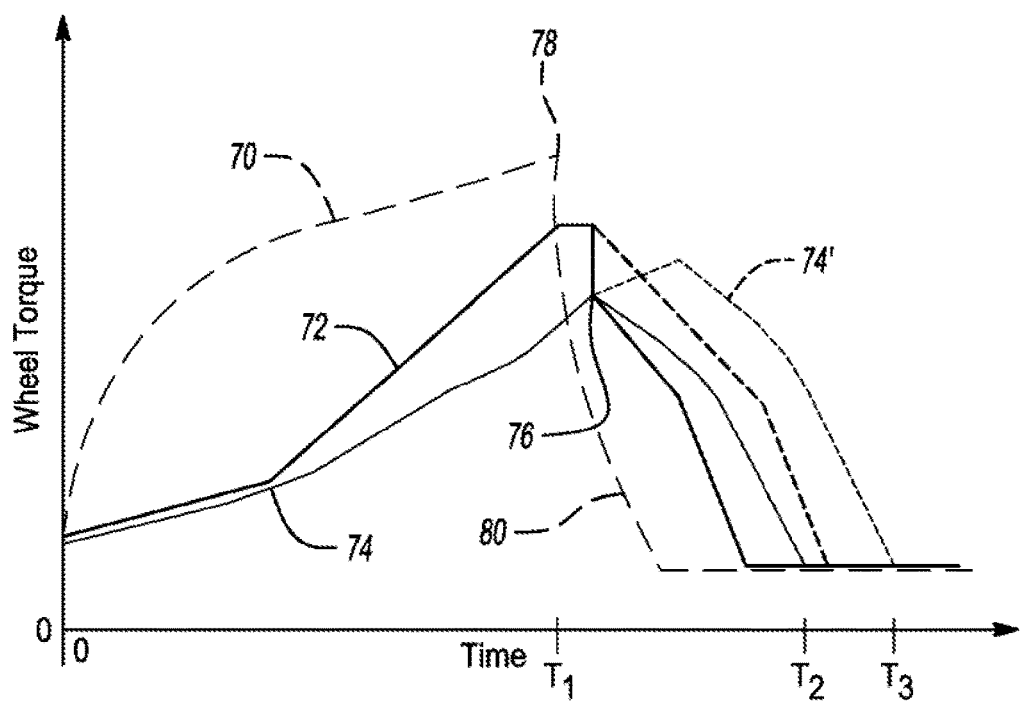
FIG. 2 is a plot showing torques during a tip-out event.

FIG. 2 illustrates an example of initiating the shaped torque during a quick tip-in to tip-out event (an increase in driver-demanded torque followed by a quick reduction in driver-demanded torque before the wheel torque catches up to the driver-demanded torque). Trace 70 illustrates the driver-demanded wheel torque command that may be based on the accelerator pedal position. Between times $T_0$ and $T_1$ the driver-demanded torque command 70 is increasing, i.e., the vehicle is accelerating. Trace 72 shows the shaped wheel torque command that is based on the driver-demanded wheel torque command 70. The shaped wheel torque 72 lags behind the driver-demanded wheel torque 70, i.e., the vehicle is producing less torque than demanded by the driver. Trace 74 shows the measured (or estimated) torque at the driven wheels. The measured wheel torque lags behind the shaped torque 72. At time $T_1$, the driver-demanded wheel torque 70 dramatically decreases due to a tip-out event. At time $T_1$, the vehicle is still attempting to increase the shaped wheel torque 72 to match the driver-demanded wheel torque 70 resulting in the in the shaped torque 72 exceeding the raw torque 70 after time $T_1$. In the absence of the proposed controls of this application, the measured wheel torque 74 may continue to increase as shown by trace 74' despite the driver now commanding reduced torque. To prevent such a result, the controls of this application may reduce the shaped wheel torque command 72 to a value matching the measured wheel torque 74 as shown at point 76 so that the vehicle slows down more quickly. This results in the measured wheel torque 74 converging with the driver-demanded wheel torque command 70 at time $T_2$ rather than at time $T_3$. This torque reduction may be referred to as initialization of shaped torque and may be commanded for a single time step, i.e., one cycle of the controller. The initialization by be trigger by the driver-demanded wheel torque command 70 changing from a first magnitude 78 that is greater than estimated wheel torque 74 at the last time step to a second magnitude 80 that is less than the estimated wheel torque 74 at the current time step.

Figure 3:
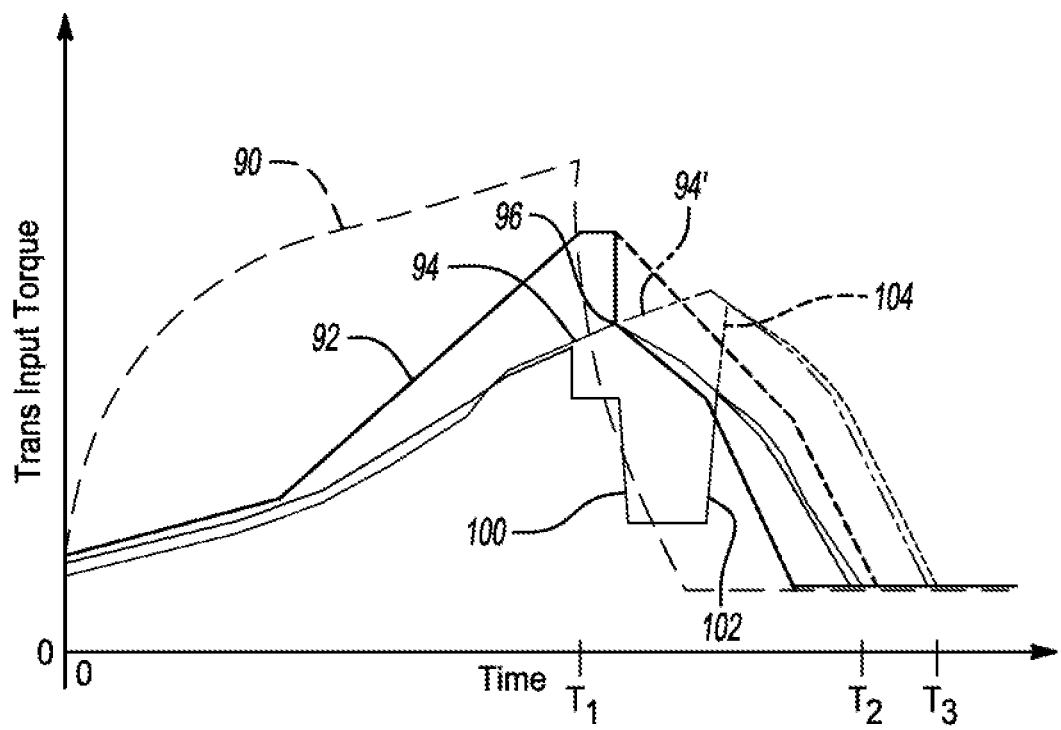
FIG. 3 is a plot showing torques during a tip-out event that includes a transmission shift.

FIG. 3 illustrates example initialization during a transmission upshift that occurs in conjunction with a tip-out event. Trace 90 illustrates the driver-demanded torque in the transmission input shaft domain. Between times $T_0$ and $T_1$ the input shaft torque command 90 is increasing, i.e., the vehicle is accelerating. Trace 92 shows the shaped transmission input torque command that is based on the torque command 90. The torque 92 lags behind the torque 90. Trace 94 shows the measured or estimated torque at the transmission input shaft. The measured torque 94 lags behind the torque 92. At time $T_1$, the torque 90 dramatically decreases due to a tip-out event. At time $T_1$, the vehicle is still attempting to increase the torque 94 to match the torque 90 resulting in the in the shaped torque 92 exceeding the driver-demanded torque 90 after time $T_1$. In the absence of initialization, the measured torque 94 may continue to increase as shown by trace 94' despite the driver now commanding reduced torque. To prevent such a result, the controls of this application may reduce the shaped torque command 92 to a value matching the measured torque 94 as shown at point 96 so that the vehicle slows down more quickly. This results in the torque 94 converging with the torque command 90 at time $T_2$ rather than at time $T_3$. Trace 100 illustrates the torque reduction of the transmission input shaft associated with the upshift. The torque reduction 100 is carried out as part of the torque phase of the upshift while the torque increase 102 is carried out as part of the inertia phase of the upshift. The initialization prevents the torque increase 102 from increasing above torque 94. In the absence of initialization, the torque may increase as shown by trace 104', which results in variance between driver expectation and vehicle performance.

Figure 4:
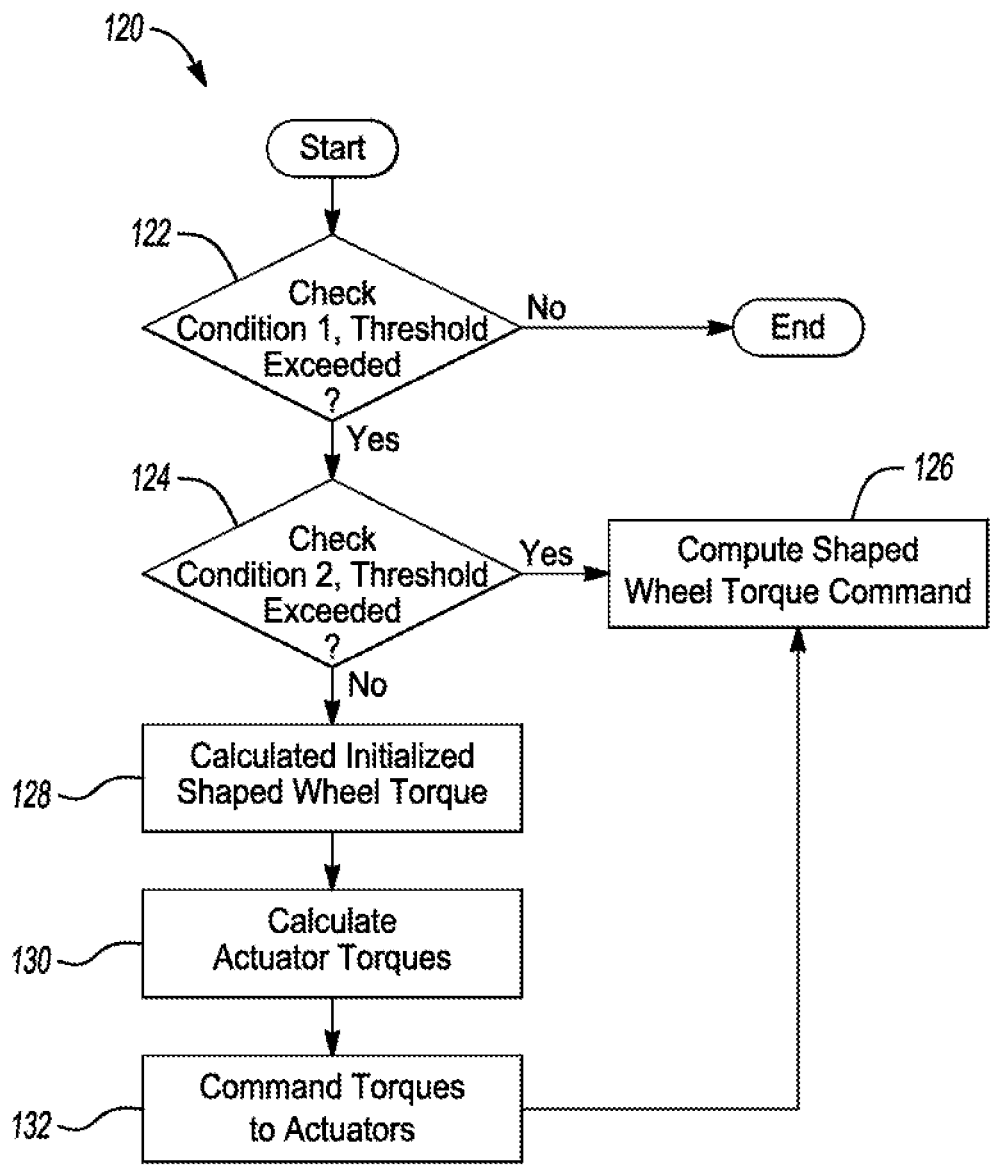
FIG. 4 is a flow chart of an algorithm for generating a lift-pedal torque for an electrified vehicle.

FIG. 4 is a flowchart 120 of an algorithm for controlling torque shaping of a driver-demanded torque. At operation 122, the controller checks condition 1 to determine if there is an active tip-out at the current time step. Condition 1 compares the shaped wheel torque command of the previous time step to the driver-demanded wheel torque command of the current time step to determine if the difference exceeds a threshold. The following equation (equation 1) may be used: (shaped wheel torque command at previous time step)−(driver-demanded wheel torque command at current time step)>threshold. If no, control ends. If yes, control passes to operation 124 and the controller checks condition 2 to determine if tip-out was active at the previous time step, i.e., if initialization has already occurred.

Condition 2 compares the shaped wheel torque command of the previous time step to the driver-demanded wheel torque command of the previous time step to determine if the difference exceeds a threshold. The following equation (equation 2) may be used: (shaped wheel torque command at previous time step)−(driver-demanded wheel torque command at previous time step)>threshold. If initialization has already occurred, the controller computes a shaped wheel torque at operation 126. The shaped wheel torque of operation 126 may be calculated as described in applicant co-pending application(s) discussed above.

Conditions 1 and 2 in conjunction are trigger conditions used to determine if initialization should be performed. These trigger conditions determine if the driver-demanded wheel torque command changes from a first magnitude that is greater than estimated wheel torque at a last time step to a second magnitude that is less than the estimated wheel torque at a current time step. If this is true, control passes to operation 128 and the controller calculates an initialized shaped wheel torque.

Calculating the initialized wheel torque at operation 128 will be described in conjunction with the vehicle 10, however, these controls are applicable to a variety of vehicle architectures having an electric machine that is either downstream of the transmission or associate with a second powertrain of the vehicle 10. The controls of operation 128 and 130 may be broken down generally into three steps: step 1 is the calculation of an initial wheel torque command, step 2 is the calculation of an initial transmission input shaft torque command, and step 3 is the calculation of an initial motor torque command. Step 1 may be performed in operation 128 and steps 2 and 3 may be performed in operation 130.

Step 1 may include three calculations. The first calculation determines the contribution of the transmission input shaft to the initial wheel torque command, i.e., the component wheel torque from transmission input shaft (component input shaft). Equation 3 may be used when no transient events (such as a transmission shift, an engine start, or a shuffle flag) are active.

Component input shaft=[min((component input shaft at previous time step−transmission gear losses)× transmission gear ratio), estimated transmission output torque]×final drive ratio     (Eq. 3)

If a transient event is occurring other equations may be used. For example, equation 4 is used if a transmission shift flag is active, equation 5 is used is engine start/stop flag is active, and equation 6 is used if an anti-shuffle flag is active.

Component input shaft=[min(component input shaft at previous time step), (Estimated transmission input shaft torque that ignores modifications to carry out transmission shift)−transmission gear losses]×transmission gear ratio×final drive ratio     (Eq. 4)

Component input shaft=[min{component input shaft at previous time step, estimated transmission input shaft torque, estimated clutch torque}− transmission gear losses]×transmission gear ratio×final drive ratio     (Eq. 5)

Component input shaft=(component input shaft at previous time step−transmission gear losses) *transmission gear ratio*final drive ratio     (Eq. 6)

The second calculation determines the contribution of the electric machine (e.g., electric machine 18) that is downstream of the transmission. The contribution of the electric machine may be referred to as component motor. Equation 7 may be used when no transient events (such as a motor damping flag or motor control flag) are active. Equation 8 may be used if the active motor damping flag or the motor control flag are active.

Component motor=[min{component motor at previous time step, estimated motor torque}]×motor gear ratio     (Eq. 7)

Component motor=component motor at previous time step×motor gear ratio     (Eq. 8)

The third calculation determines the initial wheel torque command using equation 9.

Initial wheel torque command=min{initial wheel torque command at previous time step,(component input shaft+component motor)}     (Eq. 9)

Operation 128 determines the desired initialization torques. Control then passes to operation 130 to determine how to deliver those torques with the various actuators of the vehicle, e.g., the engine 14, the electric machine 22 (if provided), and the electric machine 18. At step 2, the initial input shaft torque is calculated using equation 10 if transient events are not present.

Initial input shaft torque=min{initial input shaft torque at previous time step, estimated transmission input torque}     (Eq. 10)

If a transient event is occurring other equations may be used. For example, equation 11 may be used if a transmission shift flag is active, equation 12 may be used if an engine start/stop flag is active, and equation 13 may be used if an anti-shuffle flag is active.

Initial input shaft torque=min{initial input shaft torque at previous time step, estimated transmission input shaft torque that ignores modifications to carry out transmission shift}     (Eq. 11)

Initial input shaft torque=min{initial input shaft torque at previous time step, estimated transmission input shaft torque, estimated clutch torque}     (Eq. 12)

Initial input shaft torque=initial input shaft torque at previous time step     (Eq. 13)

At step 3, the initial motor torque is calculated using equation 14 if transient events are not present. Equation 15 may be used if the motor damping flag or the motor control flag is active.

Initial motor torque=min{initial motor torque at previous time step, estimated motor torque}     (Eq. 14)

Initial motor torque=initial motor torque at previous time step     (Eq. 15)

Control then passes to operation 132 and the controller commands the actuators to produce the torques calculated in operation 130 for a single control step, i.e., one control loop to set the initial torque for the subsequent torque shaping following the tip-in or tip-out event. Control then passes to operation 126 and the torque is shaped as described in Applicant's co-pending applications.

The above-described controls can be used with vehicles having architectures that differ from that of vehicle 10. For example, the controls may be relevant for any vehicle that includes an electric machine that is either downstream of the transmission, as shown in FIG. 1, or is part of a different powertrain as shown in FIG. 5.

Figure 5:
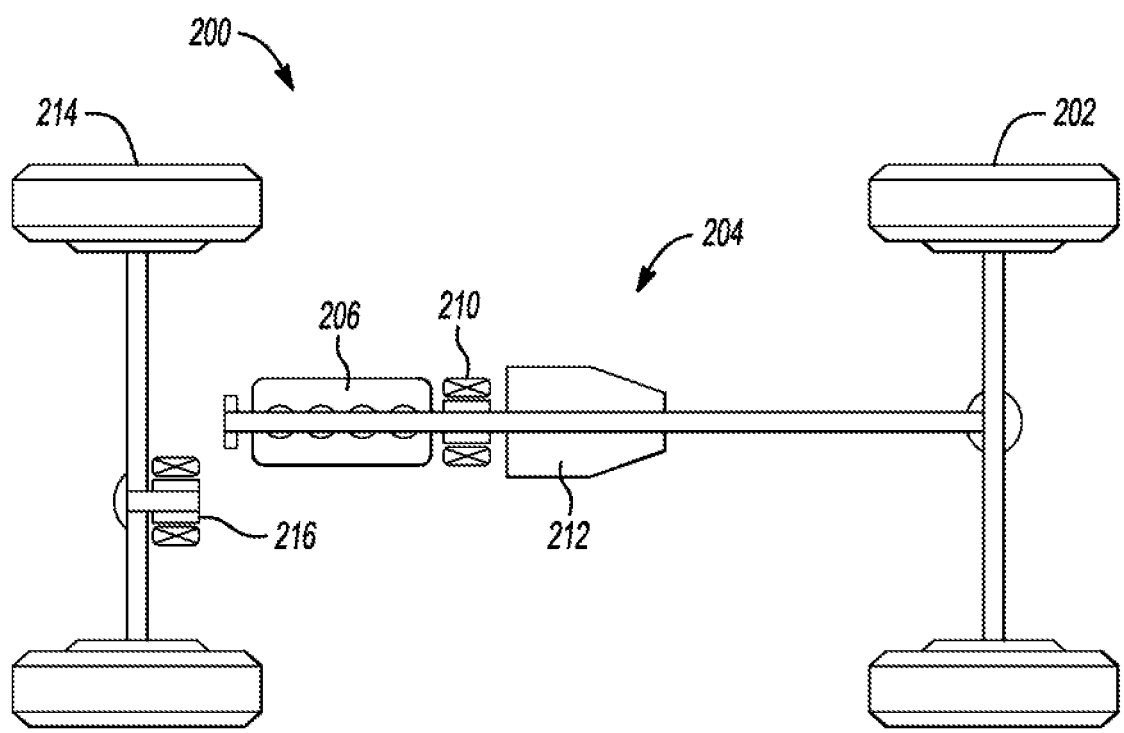
FIG. 5 is a schematic diagram of a hybrid-electric vehicle according to another embodiment.

Referring to FIG. 5, an all-wheel-drive hybrid vehicle 200 includes rear wheels 202 that are powered by a powertrain 204 having an engine 206 and an electric machine 210 that are all upstream of the transmission 212. The powertrain 204 may also include an optional belt-driven starter generator (not shown). The transmission may include a torque converter or may be a dual-clutch automatic. The front wheels 214 are powered by another electric machine 216. The electric machine 216 presents similar complexities as the electric machine 18 in terms of initialization. In order to improve performance, the above-described controls of FIG. 4 may be similarly used for the vehicle 200. For brevity, the complete controls will not be described again, and instead, only the modifications to the above equations are discussed.

The controls of operation 128 are similar for vehicle 200 except the following equations are used in substitution to the above-mentioned equations.

Component input shaft=[min{(component input shaft at previous time step−transmission gear losses)× transmission gear ratio), estimated transmission output torque}]×final drive ratio     (Eq. 3')

Component input shaft=[min{(component input shaft at previous time step), (estimated transmission input shaft torque that ignores modifications to carry out transmission shift})−transmission gear losses]×transmission gear ratio×final drive ratio     (Eq. 4')

Component input shaft=[min{component input shaft at previous time step, estimated transmission input shaft torque}−transmission gear losses]× transmission gear ratio×final drive ratio     (Eq. 5')

Component input shaft=(component input shaft at previous time step−transmission gear losses)× transmission gear ratio×final drive ratio     (Eq. 6')

The second calculation determines the contribution of the electric machine 216 to the wheel torque, which is the total wheel torque of both axles. The contribution of the electric machine 216 may be referred to as component motor.

Component motor=[min{component motor at previous time step, estimated motor torque}]×motor gear ratio     (Eq. 7')

Component motor=component motor at previous time step×motor gear ratio     (Eq. 8')

The third calculation determines the initial wheel torque command using equation 9'.

Initial wheel torque command=min{initial wheel torque command at previous time step,(component input shaft+component motor)}     (Eq. 9')

The controls of operation 130 are similar except the following equations are used in substitution to the above-mentioned equations. At step 2, the following equations may be used.

Initial input shaft torque=min{initial input shaft torque at previous time step, estimated transmission input torque}     (Eq. 10')

Initial input shaft torque=min{initial input shaft torque at previous time step, estimated transmission input shaft torque that ignores modifications to carry out transmission shift}     (Eq. 11')

Initial input shaft torque=min initial input shaft torque at previous time step, estimated transmission input shaft torque)     (Eq. 12')

Initial input shaft torque=initial input shaft torque at previous time step (Eq. 13')

At step 3, the initial motor torque is calculated using equation 14' if transient events are not present. Equation 15' may be used if the motor damping flag or motor control flag are active.

Initial motor torque=min{initial motor torque at previous time step, estimated motor torque} (Eq. 14')

Initial motor torque=initial motor torque at previous time step (Eq. 15')

The above-described controls and methods initialized the torques of the powertrain actuators at the beginning of a tip in or tip-out event in order to deliver a vehicle response that is smooth and connected to driver intention. The initialization is based on the detection of modifications to the actuator torques, due to tip-in or tip-out of the driver or the vehicle itself, and the estimated/measured torques. The proposed controls and methods are applicable to a wide variety of powertrain configurations and are not limited to those of FIGS. 1 and 5 presented above.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an axle including wheels;
a powertrain including a transmission, a first actuator upstream of the transmission, and a second actuator downstream of the transmission, wherein the first and second actuators are configured to power the wheels; and
a controller programmed to
receive a driver-demanded wheel torque command,
calculate a shaped wheel torque command based on the driver-demanded wheel torque command, and
in response to the driver-demanded wheel torque command changing from a first magnitude that is greater than an estimated wheel torque at a last time step to a second magnitude that is less than the estimated wheel torque at a current time step,
set the shaped wheel torque to a minimum of (i) a magnitude of the shaped wheel torque at the last time step and (ii) an estimated wheel torque at the current time step, and
command the first and second actuators to produce the shaped wheel torque.

2. The vehicle of claim 1, wherein the command the first and second actuators to produce the shaped wheel torque further includes command a torque to the second actuator that is equal to a minimum of (a) a previous torque commanded to the second actuator at the last time step and (b) an estimated torque of the second actuator at the current time step.

3. The vehicle of claim 2, wherein the command the first and second actuators to produce the shaped wheel torque further includes command a torque to the first actuator that is equal to a minimum of (a) a previous torque commanded to the first actuator at the last time step and (b) an estimated torque of the first actuator at the current time step.

4. The vehicle of claim 1, wherein the powertrain further includes a third actuator upstream of the transmission and configured to power the driven wheels.

5. The vehicle of claim 1, wherein the command the first and second actuators to produce the shaped wheel torque further includes, responsive to traction control being activated, command a current torque to the second actuator that is equal to a previous torque commanded to the second actuator at the last time step.

6. The vehicle of claim 1, wherein the first actuator is an engine and the second actuator is an electric machine.

7. The vehicle of claim 6, wherein the transmission includes multiple gear ratios.

8. A method of shaping wheel torque in a vehicle having a transmission, a first actuator upstream of the transmission, and a second actuator downstream of the transmission, the method comprising:
receiving a series of driver-demanded wheel torque commands;
calculating a series of shaped wheel torque commands based on the driver-demanded wheel torque commands;
in response to the driver-demanded wheel torque commands changing from a first magnitude that is greater than estimated wheel torque at a last time step to a second magnitude that is less than the estimated wheel torque at a current time step, reducing the shaped wheel torque to a minimum of (i) a magnitude of the shaped wheel torque at the last time step and (ii) an estimated wheel torque at the current time step; and
commanding the first and second actuators to produce the reduced shaped wheel torque.

9. The method of claim 8, wherein the commanding the first and second actuators to produce the reduced shaped wheel torque further includes commanding a first torque to the first actuator and commanding a second torque to the second actuator.

10. The method of claim 9, wherein the first torque commanded to the first actuator is equal to a minimum of: (a) a previous torque commanded to the first actuator at the last time step and (b) an estimated torque of the first actuator at the current time step.

11. The method of claim 10, wherein the second torque commanded to the second actuator is equal to a minimum of (a) a previous torque commanded to the second actuator at the last time step and (b) an estimated torque of the second actuator at the current time step.

12. The method of claim 9, wherein the second torque commanded to the second actuator is equal to a minimum of (a) a previous torque commanded to the second actuator at the last time step and (b) an estimated torque of the second actuator at the current time step.

13. The method of claim 8, wherein the commanding the first and second actuators to produce the reduce shaped wheel torque further includes, responsive to traction control being activated, commanding a torque to the second actuator that is equal to a previous torque commanded to the second actuator at the last time step.

14. The method of claim 8, wherein the vehicle further includes a third actuator upstream of the transmission.

15. A vehicle comprising:
a first axle including first wheels;
a second axle including second wheels;
a first actuator configured to power the first axle;
a powertrain configured to power the second axle, the powertrain including a transmission and a second actuator upstream of the transmission; and
a controller programmed to
receive a driver-demanded wheel torque command for the first and second wheels,
calculate a shaped wheel torque command based on the driver-demanded wheel torque command, and
in response to the driver-demanded wheel torque command changing from a first magnitude that is greater than estimated wheel torque of the first and second wheels at a last time step to a second magnitude that is less than the estimated wheel torque at a current time step,
set the shaped wheel torque to a minimum of (i) a magnitude of the shaped wheel torque at the last time step and (ii) an estimated wheel torque at the current time step, and
command the first and second actuators to produce the set shaped wheel torque.

16. The vehicle of claim 15, wherein the first actuator is an electric machine and the second actuator is an electric machine.

17. The vehicle of claim 16, wherein the command the first and second actuators to produce the set shaped wheel torque further includes command a torque to the first actuator that is equal to a minimum of (a) a previous torque commanded to the first actuator at the last time step and (b) an estimated torque of the first actuator at the current time step.

18. The vehicle of claim 17, wherein the command the first and second actuators to produce the set shaped wheel torque further includes command a torque to the second actuator that is equal to a minimum of (a) a previous torque commanded to the second actuator at the last time step or (b) an estimated torque of the second actuator at the current time step.

19. The vehicle of claim 15, wherein the command the first and second actuators to produce the set shaped wheel torque further includes, responsive to traction control being activated, command a torque to the second actuator that is equal to a previous torque commanded to the second actuator at the last time step.

20. The vehicle of claim 15, wherein the transmission includes multiple gear ratios.

* * * * *